UNITED STATES PATENT OFFICE.

THOMAS H. DUNHAM, OF BOSTON, MASSACHUSETTS.

IMPROVEMENT IN WATERPROOFING COMPOUNDS FOR BAGS, &c.

Specification forming part of Letters Patent No. 171,720, dated January 4, 1876; application filed June 1, 1875.

*To all whom it may concern:*

Be it known that I, THOMAS H. DUNHAM, of the city of Boston, in the county of Suffolk and State of Massachusetts, have invented certain new and useful Improvements in Waterproofing Compound for Bagging and Bags; and I do hereby declare that the following is a full, clear, and exact description thereof, which will enable others skilled in the art to which it pertains to make and use the same.

My invention consists in permeating cloth, bagging, and bags with tar, tallow, rosin, potash, ocher, whiting, sulphate of ammonia, lime, and baryta, combining water-proof and fire-proof qualities, and thus protecting cotton and other materials from damage and exposure.

In the transportation of cotton and merchandise generally, bagging, cloths, bags, and coverings are much exposed, and are liable to mildew and rot. Most of the cotton crop is baled in gunny-cloth made from jute fiber, which is very dry, and absorbs dampness or water, and rots quickly. The transportation of the cotton crop is mainly in the fall and winter months, at the most inclement season of the year, and gunny-cloth does not furnish adequate protection to the cotton at such seasons. The need of a fabric to save the cotton from waste and exposure is generally acknowledged among cotton-shippers.

My invention is intended to obviate the many objections to and disadvantages of such cotton bagging and coverings, protecting the cotton from waste and injury, while adding not very much to the expense over the materials now in use.

To state more fully the manner of carrying out my process and preparing the fabrics according to my invention, I prepare a vat of tar, (the pure tar, or it may be one-half pure and one-half coal-tar,) and to each barrel of tar I add from ten to twenty pounds of tallow, three to five pounds of rosin, three pounds of potash, forty to fifty pounds of ocher and clay; also three to five pounds sulphate of ammonia, five pounds of lime or baryta, and five pounds of crude sulphur. This mixture is then boiled, and the dry burlaps, cloths, bagging, or fabric run through it, saturating it thoroughly, and pressing out through rolls all the tar compound not required. I then run it over a drying-cylinder or steam-pipes to dry, and then through calender-rolls to press.

Having thus described my invention, what I claim, and desire to secure by Letters Patent, is—

A compound for saturating cotton bagging and bags, consisting of tallow, tar, rosin, ocher, sulphur, baryta, potash, lime, clay, chalk, and sulphate of ammonia, substantially as described.

In testimony that I claim the foregoing as my own I affix my signature in presence of two witnesses.

THOMAS H. DUNHAM.

Witnesses:
L. TOWLE,
E. M. HELMICK.